(12) United States Patent
Kamiya

(10) Patent No.: US 12,129,153 B2
(45) Date of Patent: Oct. 29, 2024

(54) MOBILE CRANE

(71) Applicant: SUMITOMO HEAVY INDUSTRIES CONSTRUCTION CRANES CO., LTD., Tokyo (JP)

(72) Inventor: Tadatoshi Kamiya, Aichi (JP)

(73) Assignee: Sumitomo Heavy Industries Construction Cranes Co., Ltd., Tokyo (JP)

(*) Notice: Subject to any disclaimer, the term of this patent is extended or adjusted under 35 U.S.C. 154(b) by 1273 days.

(21) Appl. No.: 16/723,335

(22) Filed: Dec. 20, 2019

(65) Prior Publication Data

US 2020/0198938 A1 Jun. 25, 2020

(30) Foreign Application Priority Data

Dec. 21, 2018 (JP) .................. 2018-239431

(51) Int. Cl.
*B66C 13/16* (2006.01)
*B66C 13/50* (2006.01)
(Continued)

(52) U.S. Cl.
CPC .............. *B66C 13/16* (2013.01); *B66C 13/50* (2013.01); *B66C 15/065* (2013.01); *B66C 23/36* (2013.01);
(Continued)

(58) Field of Classification Search
CPC ....... B66C 13/16; B66C 13/50; B66C 15/065; B66C 23/36; B66C 23/72; B66C 23/84;
(Continued)

(56) References Cited

U.S. PATENT DOCUMENTS 5,711,440 A * 1/1998 Wada .................... B66C 23/905
212/277
5,730,305 A  3/1998 Ichiba et al.
(Continued)

FOREIGN PATENT DOCUMENTS

DE    101 27 403 A1   12/2002
JP    H08-012274 A     1/1996
(Continued)

OTHER PUBLICATIONS

English Machine translation of 'JP-H0812274-A' (Kumazawa Koji) (Year: 1996).*

(Continued)

*Primary Examiner* — Alvaro E Fortich
*Assistant Examiner* — Martin Walter Braunlich
(74) *Attorney, Agent, or Firm* — Michael Best & Friedrich LLP

(57) ABSTRACT

There is provided a mobile crane including an undercarriage, turning body turnably supported by the undercarriage, a boom derrickably supported by the turning body, a derricking unit that causes the boom to perform a derricking operation, a derricking force measurement unit that measures a derricking force by which the derricking unit causes the boom to perform the derricking operation, a ground angle acquisition unit that acquires a boom-to-ground angle which is an angle of the boom relative to a ground where the undercarriage is disposed, and an actually suspended load calculation unit that calculates an actually suspended load, based on the derricking force and the boom-to-ground angle.

14 Claims, 9 Drawing Sheets

(51) Int. Cl.
*B66C 15/06* (2006.01)
*B66C 23/36* (2006.01)
*B66C 23/72* (2006.01)
*B66C 23/84* (2006.01)
*B66C 23/90* (2006.01)
*B66C 23/94* (2006.01)
*G01C 9/00* (2006.01)
*G01G 19/14* (2006.01)
*G01L 5/04* (2006.01)
*G07C 5/08* (2006.01)

(52) U.S. Cl.
CPC .............. *B66C 23/72* (2013.01); *B66C 23/84* (2013.01); *B66C 23/905* (2013.01); *B66C 23/94* (2013.01); *G01G 19/14* (2013.01); *G07C 5/085* (2013.01); *B66C 2700/0371* (2013.01); *G01C 9/00* (2013.01); *G01L 5/04* (2013.01)

(58) Field of Classification Search
CPC ................. B66C 23/905; B66C 23/94; B66C 2700/0371; B66C 23/90; G01C 9/00; G01G 19/14; G01L 5/04; G07C 5/085
See application file for complete search history.

(56) References Cited

U.S. PATENT DOCUMENTS

| | | | | |
|---|---|---|---|---|
| 5,823,370 | A * | 10/1998 | Ueda | B66C 23/905 |
| | | | | 212/276 |
| 8,768,562 | B2 * | 7/2014 | Matsumoto | B66C 23/905 |
| | | | | 701/30.9 |
| 9,327,946 | B2 * | 5/2016 | Stakor | B66C 13/18 |
| 11,618,654 | B2 * | 4/2023 | Mori | B66C 13/16 |
| | | | | 701/29.1 |
| 2015/0210515 | A1 * | 7/2015 | Pech | B66C 23/76 |
| | | | | 212/197 |
| 2022/0194751 | A1 * | 6/2022 | Stilborn | B66D 1/56 |

FOREIGN PATENT DOCUMENTS

| | | |
|---|---|---|
| JP | H0812274 A * | 1/1996 |
| JP | 3256087 B2 | 2/2002 |
| JP | 2008-094623 A | 4/2008 |

OTHER PUBLICATIONS

Search Report issued in European Application No. 19216762.5, dated May 19, 2020.

* cited by examiner

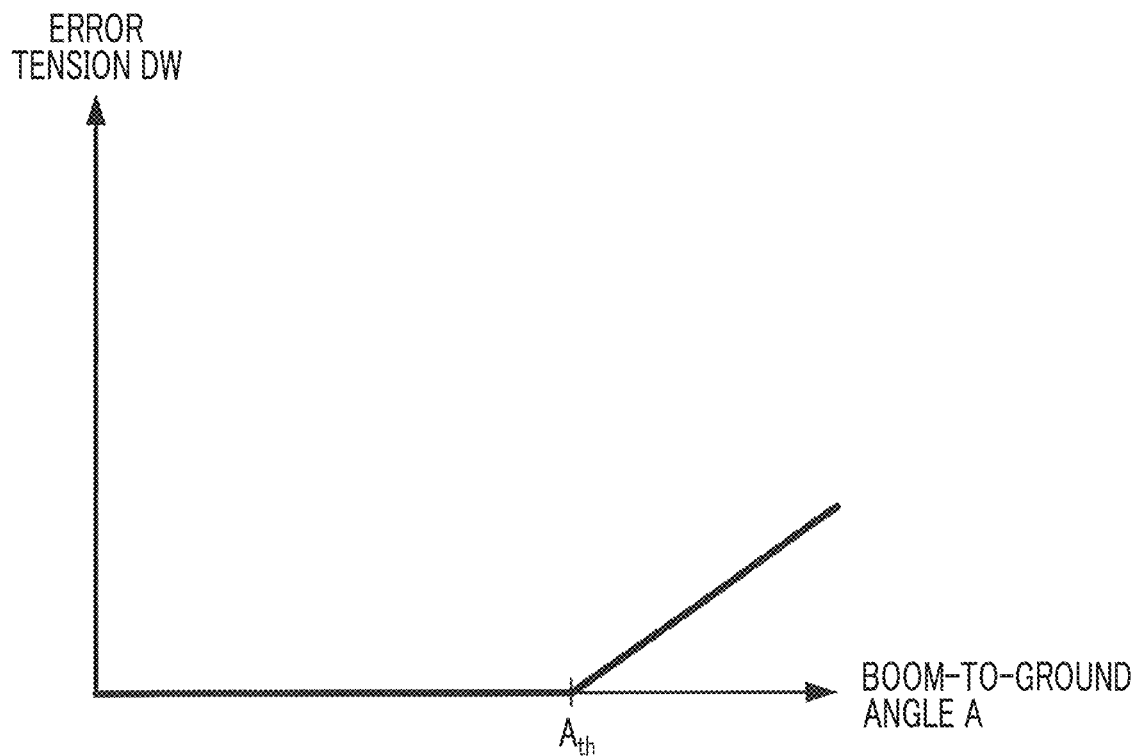

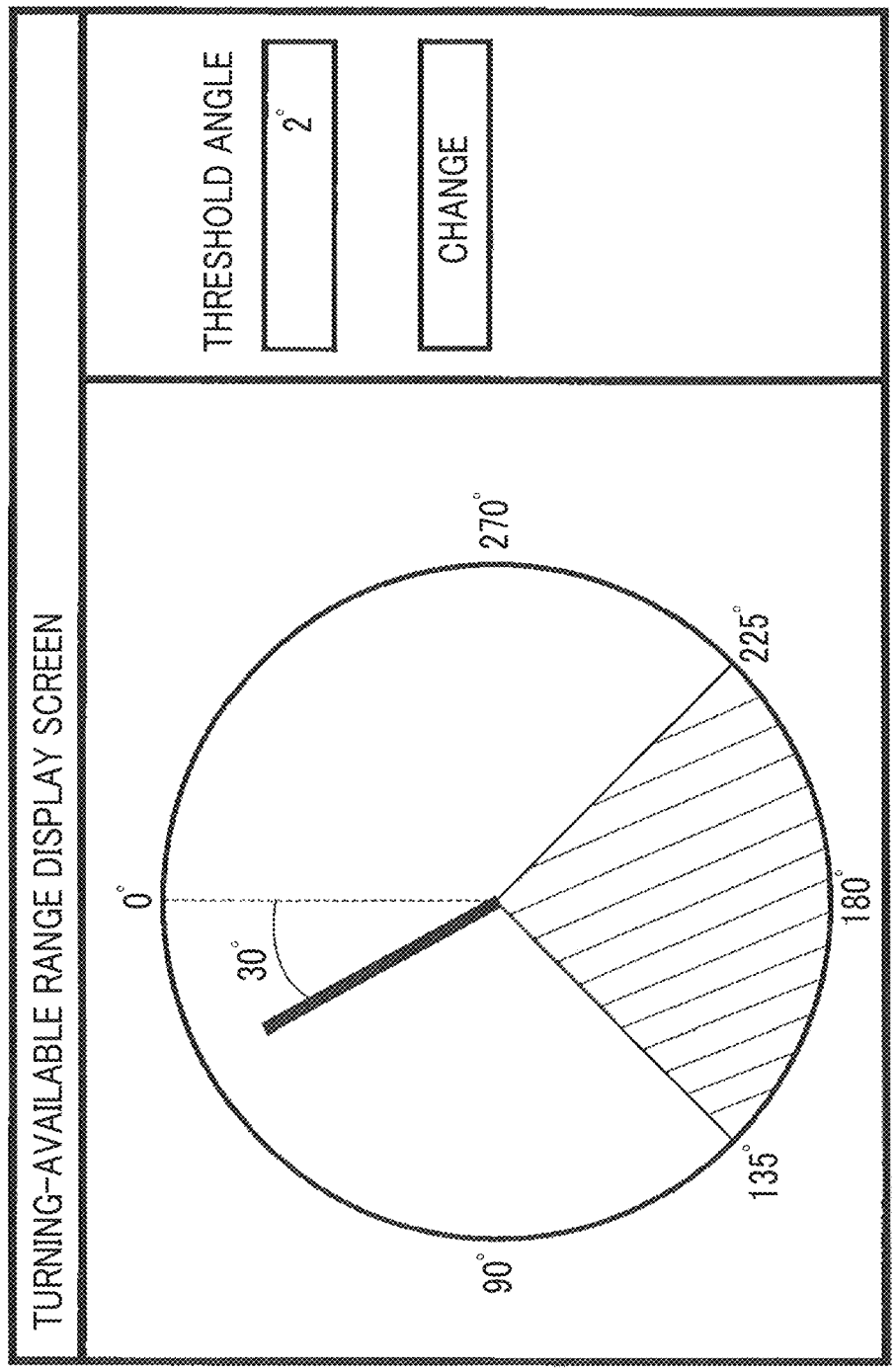

MOBILE CRANE

RELATED APPLICATIONS

The content of Japanese Patent Application No. 2018-239431, on the basis of which priority benefits are claimed in an accompanying application data sheet, is in its entirety incorporated herein by reference.

BACKGROUND

Technical Field

Certain embodiments of the present invention relate to a mobile crane.

Description of Related Art

In the related art, a mobile crane is known which is equipped with a function to calculate an actually suspended load that is a load suspended by a hook. For example, a technique is disclosed as follows in the related. An actually suspended load is calculated in view of contraction of a buffer spring in a backstop, based on tension of a derricking rope and a detection result of a derricking angle of a boom.

SUMMARY

According to an embodiment of the present invention, there is provided a mobile crane including an undercarriage, a turning body turnably supported by the undercarriage, a boom derrickably supported by the turning body, a derricking unit that causes the boom to perform a derricking operation, a derricking force measurement unit that measures a derricking force by which the derricking unit causes the boom to perform the derricking operation, a ground angle acquisition unit that acquires a boom-to-ground angle A which is an angle of the boom relative to a ground where the undercarriage is disposed, and an actually suspended load calculation unit that calculates an actually suspended load W, based on the derricking force and the boom-to-ground angle A.

BRIEF DESCRIPTION OF THE DRAWINGS

FIG. 5 is a view illustrating a relationship between a boom-to-ground angle A and an error tension DW.

FIG. 6 is a view illustrating an example of a rated load table for each turning body inclination angle $A_2$.

FIG. 11 is a display example of a turning-available range display screen.

DETAILED DESCRIPTION

However, according to Japanese Patent No. 3256087, on the assumption that a mobile crane is placed on a horizontal plane, the actually suspended load is calculated, based on the derricking angle of the boom. Therefore, in a state where the mobile crane is placed on an inclined surface, there is a problem in that a result obtained by calculating the actually suspended load may include an error.

It is desirable to provide a technique capable of very accurately calculating an actually suspended load even in a case a mobile crane is used on an inclined surface.

According to an embodiment of the present invention, the actually suspended load W is calculated based on the boom-to-ground angle A. Therefore, even in a case where the mobile crane is used on an inclined surface, the actually suspended load W can be very accurately calculated. A problem, configuration, and advantageous effect which are other than those described above will be clarified in the following description of embodiments.

Embodiment

Figure 1:
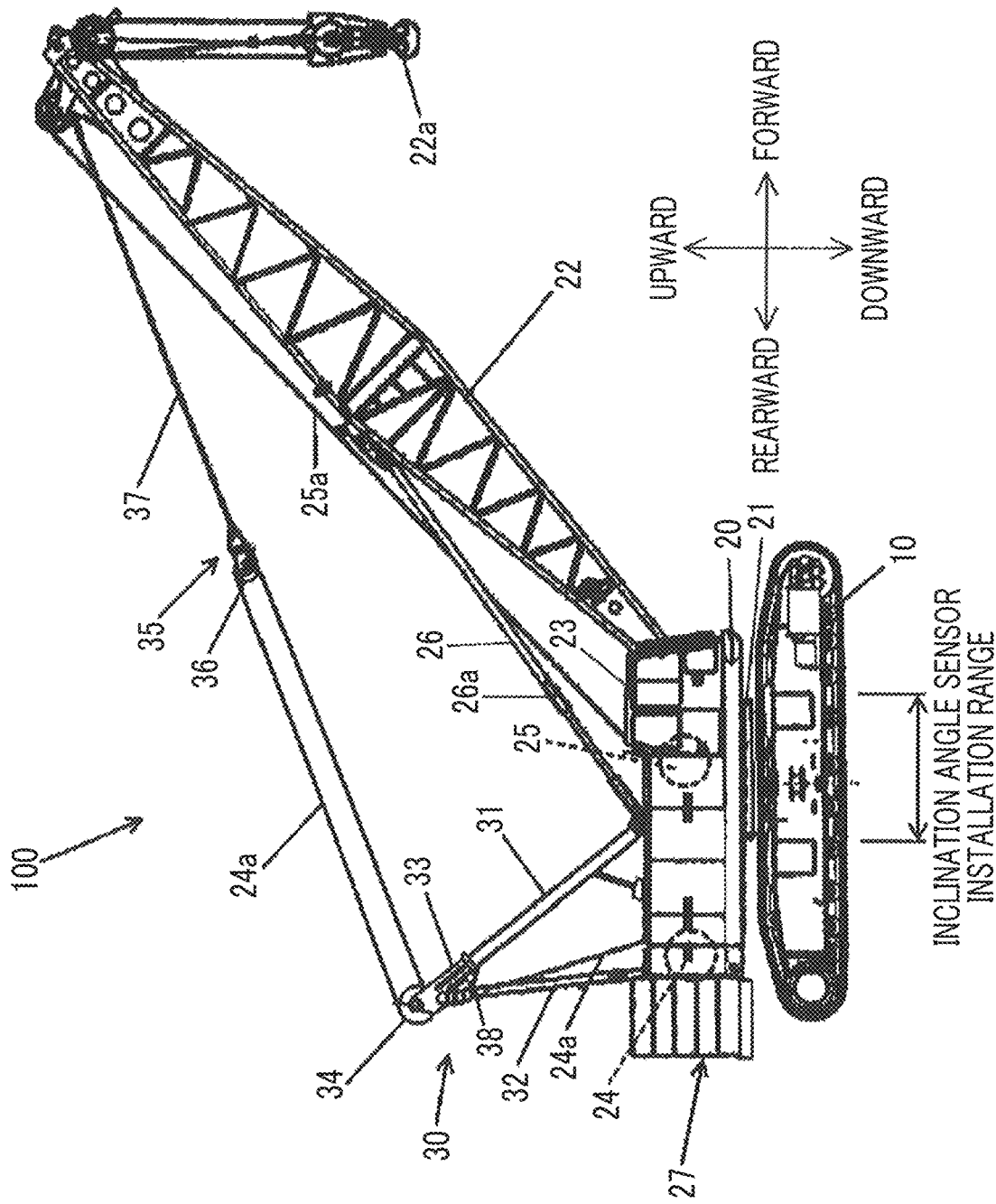
FIG. 1 is a side view of a crawler crane according to one embodiment.

Hereinafter, an embodiment according to the present invention will be described with reference to the drawings. FIG. 1 is a side view of a crawler crane 100 serving as a representative example of a mobile crane. Unless otherwise specified, a forward-rearward direction and a rightward-leftward direction which are used for description in FIG. 1 are based on a visual point of an operator who gets on and operates the crawler crane 100.

As illustrated in FIG. 1, the crawler crane 100 is configured to include a lower traveling body (crawler) 10 capable of traveling, and a rotating platform 20 turnably supported on the lower traveling body 10 via a turning wheel 21.

The lower traveling body 10 includes a pair of caterpillars in both ends in the rightward-leftward direction. The lower traveling body 10 moves forward and rearward as rotation of a hydraulic motor (not illustrated) is transmitted thereto. The hydraulic motor is rotated using hydraulic oil supplied from a hydraulic pump (not illustrated) driven by an engine (not illustrated). In this manner, the crawler crane 100 travels. The lower traveling body 10 may adopt a wheeled type instead of the caterpillar.

The rotating platform 20 turns around the turning wheel 21 as a turning motor 21a (refer to FIG. 2) is rotated. The rotating platform 20 mainly includes a boom 22, a cabin 23, a derricking winch (derricking unit) 24, a raising and lowering winch 25, a backstop 26, a counterweight 27, and a gantry 30.

A proximal end portion of the boom 22 is derrickably supported in the upward-downward direction by the rotating platform 20 in a front end of the rotating platform 20 and in a central portion of the rotating platform 20 in the rightward-leftward direction. The boom 22 extends forward and upward of the rotating platform 20. A hook rope 25a extending from the raising and lowering winch 25 is suspended from a tip of the boom 22, and a hook 22a is attached to a tip of the hook rope 25a. However, a position of the proximal end portion of the boom 22 may be offset from the central portion of the rotating platform 20 in the rightward-leftward direction.

The cabin 23 has an internal space on which an operator who operates the crawler crane 100 gets. The internal space of the cabin 23 has an operating unit 23a (refer to FIG. 2) that receives operations of the operator for causing the lower traveling body 10 to travel, causing the rotating platform 20 to turn, causing the boom 22 to perform a derricking operation, and causing the hook 22a to perform a raising and lowering operation. The operating unit 23a outputs operation signals corresponding to the operations of the operator, to a controller 50 (refer to FIG. 2, to be described later). That is, the operator getting on the cabin 23 operates the operating unit 23a, thereby operating the crawler crane 100.

For example, the operating unit 23a includes an accelerator pedal that controls an engine speed, a traveling lever that steers and brakes the lower traveling body 10, a turning lever that turns the rotating platform 20, a derricking lever that rotates the derricking winch 24, and a raising and lowering lever that rotates the raising and lowering winch 25. However, a specific configuration of the operating unit 23a is not limited to the above-described example.

The derricking winch 24 causes the boom 22 to perform the derricking operation by unwinding or winding the derricking rope 24a. The raising and lowering winch 25 raises or lowers the hook 22a by unwinding or winding the hook rope 25a. The turning motor 21a, the derricking winch 24, and the raising and lowering winch 25 (in some cases, collectively referred to as an "actuator") adopt a hydraulic type rotated by receiving supplied hydraulic oil from a hydraulic pump (not illustrated), for example.

The backstop 26 presses the boom 22 in a downward falling direction in order to prevent the boom 22 from falling rearward. One end of the backstop 26 is rotatably supported by the rotating platform 20, and the other end is rotatably supported by the boom 22. The backstop 26 has a buffer spring 26a that contracts if a boom-to-ground angle A (to be described later) exceeds a threshold angle $A_{th}$.

The backstop 26 presses the boom 22 in the downward falling direction by using a restoring force of the contracted buffer spring 26a. A specific example of the pressing member that presses the boom 22 is not limited to the buffer spring 26a, and may be a hydraulic cylinder that receives the supplied hydraulic oil having a pressure amount corresponding to the boom-to-ground angle A.

A specific configuration of the backstop 26 is not limited to the above-described example. As another example, the backstop 26 may be supported by one of the rotating platform 20 and the boom 22. The backstop 26 may come into contact with the other of the rotating platform 20 and the boom 22 when the boom-to-ground angle A reaches the threshold angle $A_{th}$, thereby preventing the boom 22 from falling rearward.

The counterweight 27 is supported by the rotating platform 20 on a side opposite to the boom 22 across the turning wheel 21. That is, the counterweight 27 is placed on a rear end of the rotating platform 20. The counterweight 27 is a weight placed on the rotating platform 20 in order to keep a balance for a load suspended by the hook 22a.

The gantry 30 mainly includes a front leg 31 and a rear leg 32. A proximal end portion of the front leg 31 is rotatably connected to a bracket disposed in the central portion of the rotating platform 20. A proximal end portion of the rear leg 32 is rotatably connected to a bracket disposed on a rear side of the rotating platform 20. The gantry 30 is raised and lowered by expansion and contraction of a hydraulic cylinder (not illustrated).

A lower spreader 33 including a lower sheave 34 is fixed to an upper end side of the front leg 31. An upper spreader 35 including an upper sheave 36 is interposed between the lower spreader 33 and the tip portion of the boom 22. The derricking rope 24a is wound multiple times around the upper sheave 36 of the upper spreader 35 and the lower sheave 34 of the lower spreader 33.

One end of the upper spreader 35 is connected to a pendant rope 37 fixed to the tip portion of the boom 22. The derricking rope 24a extending from the derricking winch 24 is connected to a load cell (derricking force measurement unit) 38 whose tip is attached to the lower spreader 33. If the derricking rope 24a is wound or unwound by the derricking winch 24, the boom 22 performs the derricking operation by changing an interval between the lower spreader 33 and the upper spreader 35.

A specific configuration for causing the boom 22 to perform the derricking operation is not limited to the above-described example. As another example, the crawler crane 100 may include a live mast (not illustrated) instead of the gantry 30, or together with the gantry 30. The live mast is a long bar-shaped member that is rotatably supported by the rotating platform 20 in the vicinity of a connecting portion of the boom 22 connected to the rotating platform 20.

The derricking rope 24a extending from the derricking winch 24 is connected to the rotating platform 20 via a sheave disposed in a tip portion of the live mast. The tip portion of the live mast and the tip portion of the boom 22 are connected to each other by the pendant rope 37. In the above-described configuration, if the derricking rope 24a is wound by the derricking winch 24, the live mast is lowered, and the boom 22 is raised. On the other hand, if the derricking rope 24a is unwound by the derricking winch 24, the live mast is raised, and the boom 22 is lowered.

Figure 2:
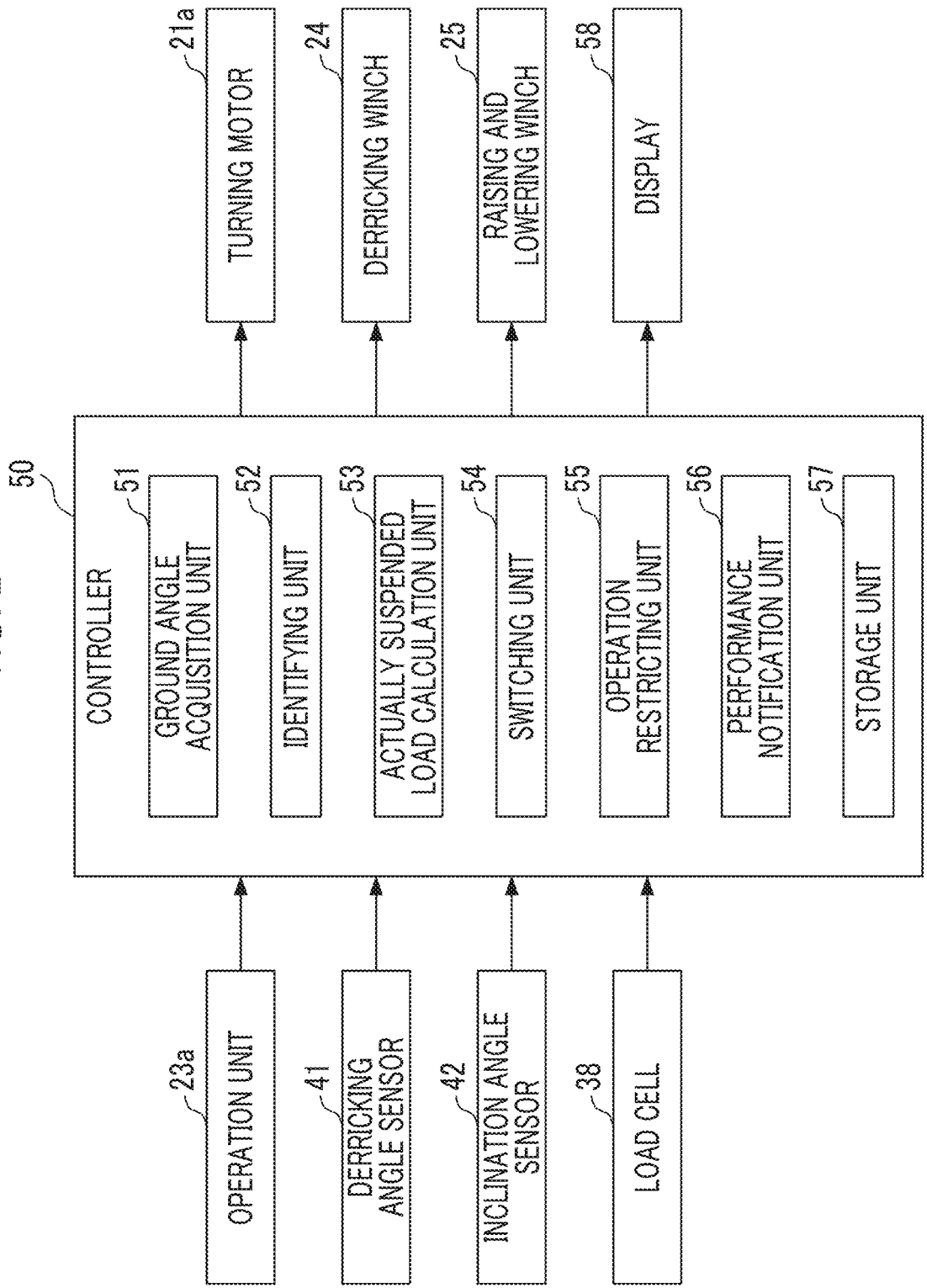
FIG. 2 is a functional block diagram of a controller according to the embodiment.
Figure 3:
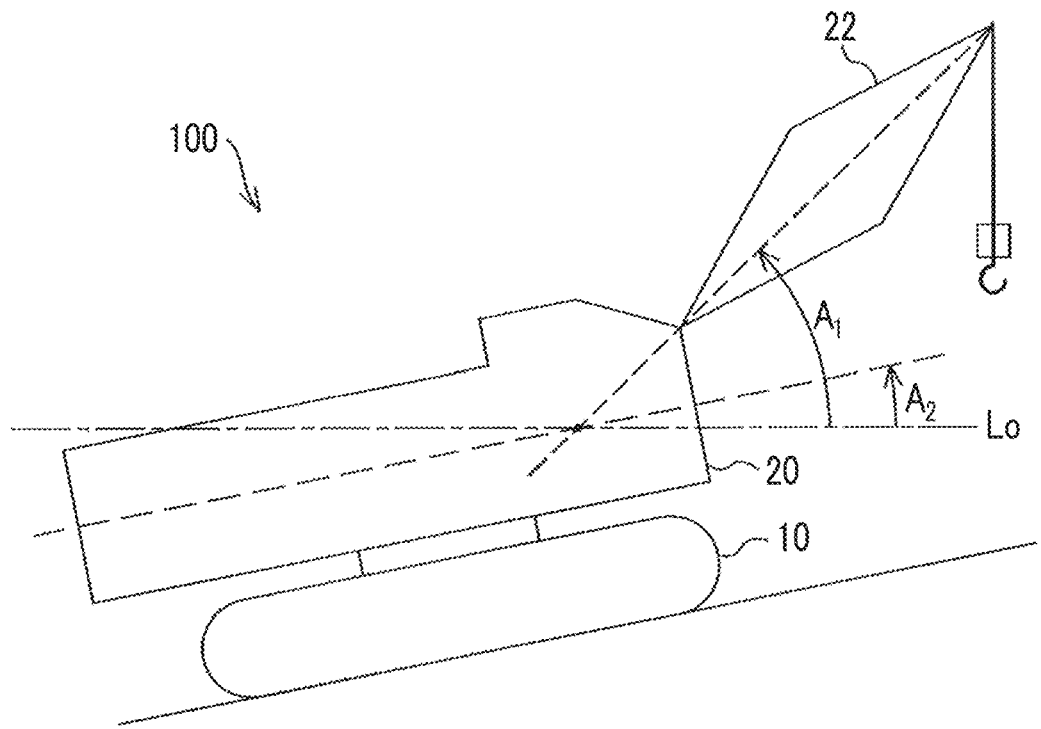
FIG. 3 is a view illustrating a state where the crawler crane is placed on an upward slope.
Figure 4:
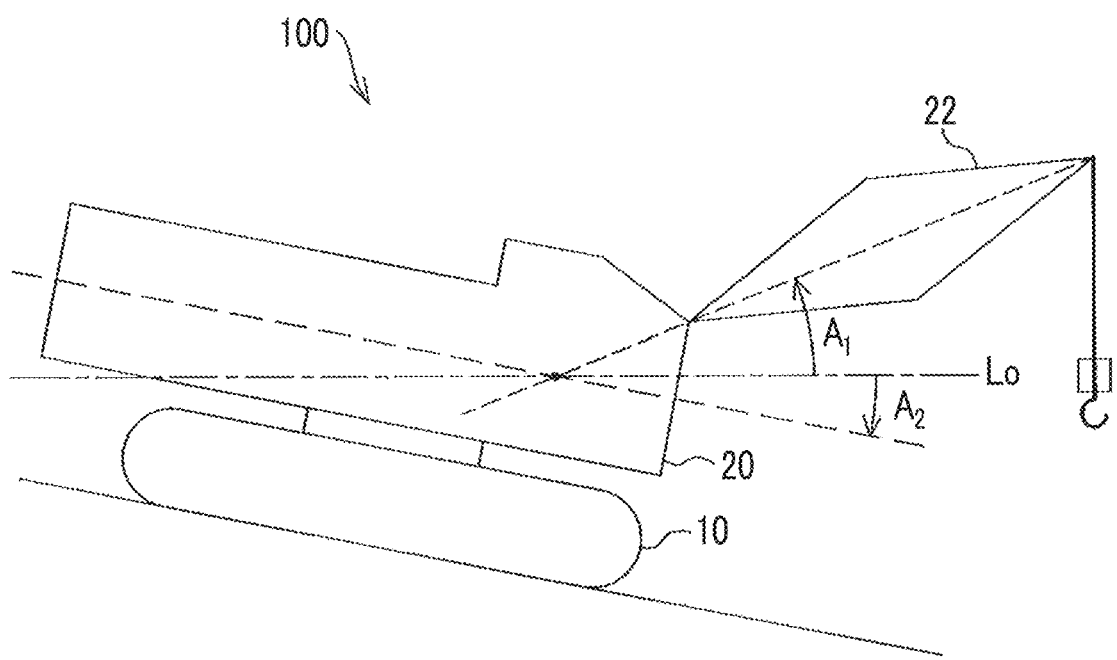
FIG. 4 is a view illustrating a state where the crawler crane is placed on a downward slope.

Next, the controller 50 included in the crawler crane 100 will be described with reference to FIGS. 2 to 6. FIG. 2 is a functional block diagram of the controller 50. FIG. 3 is a view illustrating a state where the crawler crane 100 is placed on an upward slope. FIG. 4 is a view illustrating a state where the crawler crane 100 is placed on a downward slope. FIG. 5 is a view illustrating a relationship between the boom-to-ground angle A and an error tension DW. FIG. 6 is a view illustrating an example of a rated load table for each turning body inclination angle $A_2$.

As illustrated in FIG. 2, the controller 50 acquires an operation signal output from the operating unit 23a, and each detection signal output from a derricking angle sensor 41, an inclination angle sensor 42, and the load cell 38, and controls each operation of the turning motor 21a, the derricking winch 24, the raising and lowering winch 25, and a display 58, based on the various acquired signals.

As illustrated in FIGS. 3 and 4, the derricking angle sensor 41 detects a boom derricking angle $A_1$ which is an angle formed by the boom 22 relative to a horizontal line $L_o$, and outputs a detection signal indicating the detected boom derricking angle $A_1$, to the controller 50. The horizontal line $L_o$ is a straight line perpendicular to the rightward-leftward direction of the rotating platform 20 and extending in a horizontal direction. That is, when the crawler crane 100 is disposed on a horizontal plane, the horizontal line $L_o$ coincides with the forward-rearward direction of the rotating platform 20. The boom derricking angle $A_1$ indicates an upward angle, based on the horizontal line $L_o$.

The inclination angle sensor 42 detects a turning body inclination angle $A_2$ which is an angle formed by the rotating platform 20 relative to the horizontal line $L_o$, and outputs a detection signal indicating the detected turning body inclination angle $A_2$ to the controller 50. In the turning body inclination angle $A_2$, an upward angle based on the horizontal line $L_o$ is set as a positive angle (refer to FIG. 3), and a downward angle based on the horizontal line $L_o$ is set as a negative angle (refer to FIG. 4).

As illustrated in FIGS. 3 and 4, the rotating platform 20 always maintains a state of being parallel to the ground on which the crawler crane 100 is disposed. Therefore, the turning body inclination angle $A_2$ can be rephrased as an angle formed between the ground on which the lower traveling body 10 is disposed and the horizontal line $L_o$.

For example, a known pendulum type sensor can be adopted as the derricking angle sensor 41 and the inclination angle sensor 42. The derricking angle sensor 41 is installed in the boom 22, and the inclination angle sensor 42 is installed in the rotating platform 20. According to this disposition, an error caused by an operation such as a turning operation of the crawler crane 100 is less likely to occur in the turning body inclination angle $A_2$ detected by the inclination angle sensor 42. However, the inclination angle sensor 42 may be installed in the lower traveling body 10.

More specifically, as illustrated in FIG. 1, it is desirable that the inclination angle sensor 42 is disposed in front of the counterweight 27 in the forward-rearward direction of the rotating platform 20. It is more desirable that the inclination angle sensor 42 is disposed between a front end and a rear end of the turning wheel 21 in the forward-rearward direction of the rotating platform 20. However, the inclination angle sensor 42 may be disposed outside the turning wheel 21 in the rightward-leftward direction of the rotating platform 20.

The load cell 38 is a tension sensor that detects an actually measured tension $T_L$ (derricking force) applied to the derricking rope 24a and outputs a detection signal indicating the detected actually measured tension $T_L$ to the controller 50. In a case where the boom-to-ground angle A (to be described later) is smaller than the threshold angle Ath, the actually measured tension $T_L$ tends to increase as the load suspended by the hook 22a increases, and tends to decrease as the boom derricking angle $A_1$ increases. On the other hand, when the boom-to-ground angle A is equal to or larger than the threshold angle $A_{th}$, the boom-to-ground angle A tends to increase due to a pressing force of the buffer spring 26a as the boom-to-ground angle A increases.

As illustrated in FIG. 2, the controller 50 mainly includes a ground angle acquisition unit 51, an identifying unit 52, an actually suspended load calculation unit 53, a switching unit 54, an operation restricting unit 55, a performance notification unit 56, and a storage unit 57.

The ground angle acquisition unit 51 acquires the boom-to-ground angle A which is an angle of the boom 22 relative to the ground on which the lower traveling body 10 is disposed. More specifically, the ground angle acquisition unit 51 acquires the boom-to-ground angle A by subtracting (calculating) the turning body inclination angle $A_2$ detected by the inclination angle sensor 42 from the boom derricking angle $A_1$ detected by the derricking angle sensor 41.

The identifying unit 52 identifies the error tension DW, based on the boom-to-ground angle A acquired by the ground angle acquisition unit 51, and identifies the rated total load $W_C$, the non-load tension $T_0$, and the rated tension $T_2$, based on the boom derricking angle $A_1$ detected by the derricking angle sensor 41. A relationship between the error tension DW and the boom-to-ground angle A, and a relationship between each of the rated total load $W_C$, the non-load tension $T_0$, and the rated tension $T_2$, and the boom derricking angle $A_1$ are stored in advance in the storage unit 57 in a form of a graph, a table, or a function, for example.

The error tension DW indicates a tension applied to the derricking rope 24a by the pressing force of the backstop 26. As illustrated in FIG. 5, when the boom-to-ground angle A is smaller than the threshold angle $A_{th}$ (that is, before the buffer spring 26a starts to contract), the error tension DW is 0 N. On the other hand, when the boom-to-ground angle A is equal to or larger than the threshold angle $A_{th}$ (that is, after the buffer spring 26a starts to contract), as the boom-to-ground angle A increases (that is, a contraction amount of the buffer spring 26a increases), the error tension DW increases.

The rated total load $W_C$ indicates a maximum load which can be lifted by the crawler crane 100. The rated total load $W_C$ is a value determined in advance from a viewpoint of preventing the crawler crane 100 from being fallen down or damaged, in view of stability or strength of the crawler crane 100. The rated total load $W_C$ tends to increase as the boom derricking angle $A_1$ increases.

The non-load tension $T_0$ is a tension applied to the hook rope 25a when no load is suspended by the hook 22a. That is, the non-load tension $T_0$ indicates a tension applied to the hook rope 25a by each weight of the boom 22 and the hook 22a. The non-load tension $T_0$ tends to decrease as the boom derricking angle $A_1$ increases.

The rated tension $T_2$ indicates a tension applied to the hook rope 25a when a load having a known weight (for example, the rated total load $W_C$) is suspended by the hook 22a. The rated tension $T_2$ tends to decrease as the boom derricking angle $A_1$ increases.

The actually suspended load calculation unit 53 calculates the actually suspended load W which is the weight of the load suspended by the hook 22a, based on $W=\{(T_L-T_0-DW)/(T_2-T_0)\}\times W_C$ Equation (1). Specifically, the actually suspended load calculation unit 53 substitutes the actually measured tension $T_L$ detected by the load cell 38, the rated total load $W_C$ identified by the identifying unit 52, the non-load tension $T_0$, the rated tension $T_2$, and the error tension DW for Equation (1) above.

The switching unit 54 switches the lifting performance of the load lifted by the crawler crane 100, based on the turning body inclination angle $A_2$ detected by the inclination angle sensor 42. Specifically, the switching unit 54 reads a rated load table corresponding to the current turning body inclination angle A2 from a plurality of rated load tables stored in the storage unit 57, and notifies the operation restricting unit 55 and the performance notification unit 56 of the rated load table.

As illustrated in FIG. 6, the rated load table is a table indicating a rated load corresponding to a working radius R of the crawler crane 100. According to the embodiment, the storage unit 57 stores a plurality of rated load tables associated with each of the turning body inclination angles $A_2=1°$, 2°, and 3°. The rated load corresponding to the working radius R may be stored in the storage unit 57 in a form of a function instead of the table form.

The rated load tends to decrease as the working radius R increases. On the other hand, when the working radius R is equal, the rated load is a value determined in advance to decrease as the turning body inclination angle $A_2$ increases. The working radius R can be calculated by substituting the boom derricking angle $A_1$ detected by the derricking angle sensor 41 and a length of the boom 22 in an extending direction for a known trigonometric function.

The operation restricting unit 55 restricts an operation of the crawler crane 100 which exceeds the lifting performance, based on the rated load table acquired from the switching unit 54. Specifically, while a specific operation is instructed through the operating unit 23a, the operation restricting unit 55 compares the actually suspended load W calculated by the actually suspended load calculation unit 53 with the rated load of the rated load table acquired from the switching unit 54. The operation restricting unit 55 stops the specific operation in accordance with a signal indicating that the actually suspended load W is equal to or greater than the rated load.

The rated load stored in the rated load table may indicate the weight of the suspended load alone or the above-described rated total load $W_C$. In a case where the rated total load $W_C$ is stored in the rated load table, the operation restricting unit 55 may stop the specific operation, in accordance with a signal indicating that a value obtained by adding the weight of the boom 22 and the hook 22a to the actually suspended load W is equal to or greater than the rated total load $W_C$.

The specific operation indicates an operation in a direction where the performance of the crawler crane 100 is reduced. Specifically, the specific operation indicates lowering of the boom 22 (that is, unwinding of the derricking winch 24) and lifting of the hook 22a (that is, winding of the raising and lowering winch 25). In a case where the boom 22 is extendable, extension of the boom 22 may be included in the specific operation.

The performance notification unit 56 notifies an operator of the lifting performance of the crawler crane 100 through the display 58, based on the rated load table acquired from the switching unit 54. For example, information displayed on the display 58 includes the turning body inclination angle $A_2$ and the boom-to-ground angle A in addition to the boom derricking angle $A_1$, the actually suspended load W, the rated load, and the working radius R.

The storage unit 57 stores a relationship between the boom-to-ground angle A and the error tension DW which are illustrated in FIG. 5, a relationship between the boom derricking angle $A_1$ and the rated total load $W_C$, a relationship between the boom derricking angle $A_1$ and the non-load tension $T_0$, a relationship between the boom derricking angle $A_1$ and the rated tension $T_2$, the plurality of rated load tables illustrated in FIG. 6, and other programs. Without being limited to a linear shape illustrated in FIG. 5, the relationship between the boom-to-ground angle A and the error tension DW may be a quadratic curve, a hyperbola, an exponential curve, or a logarithmic curve. The relationships between the rated total load $W_C$, the non-load tension $T_0$, the rated tension $T_2$, and the boom derricking angle $A_1$ are the same as above.

The display 58 is disposed in the cabin 23. The display 58 is hardware that notifies an operator who gets on the cabin 23 of information. However, a specific example of the hardware that notifies the operator of the information is not limited to the display 58, and may be, an LED lamp or a speaker, for example.

The controller 50 includes a central processing unit (CPU), a read only memory (ROM), a random access memory (RAM), and a hard disc drive (HDD). Processes of respective processing unit 51 to 56 are realized by the CPU reading and executing programs from the ROM, the RAM, and the HDD. The storage unit 57 is configured to include the ROM, the RAM, and the HDD.

However, a specific configuration of the controller 50 is not limited thereto, and the processes may be realized by hardware such as an application specific integrated circuit (ASIC) and a field-programmable gate array (FPGA).

Figure 7:
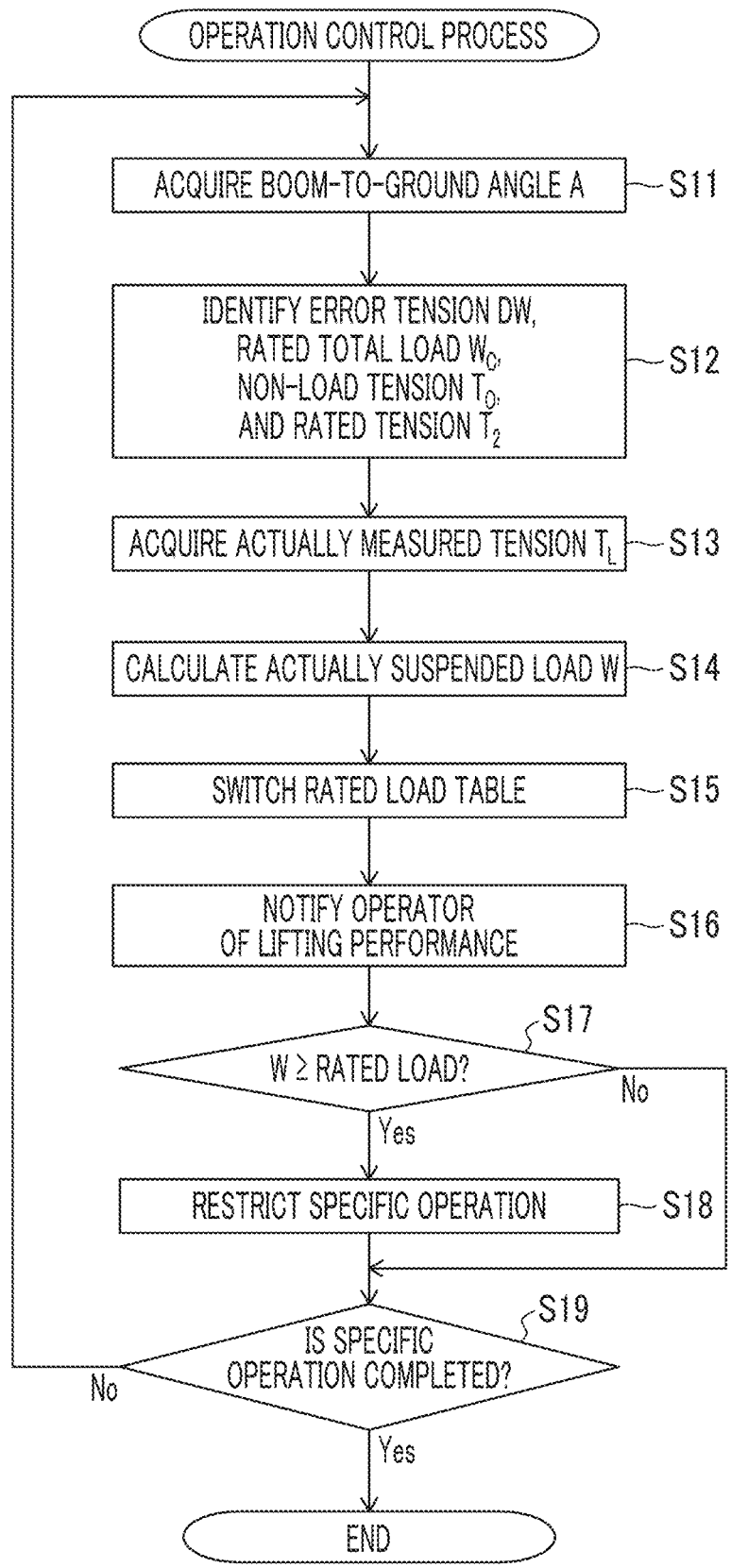
FIG. 7 is a flowchart of a drive control process.

Next, an operation control process performed by the controller 50 will be described with reference to FIG. 7. The operation control process is a process for controlling the operation of the crawler crane 100 which exceeds the lifting performance, based on the actually suspended load W calculated based on the boom-to-ground angle A. For example, the controller 50 may start the operation control process in accordance with a notification that an operation signal instructing to perform the specific operation is output from the operating unit 23a.

First, the ground angle acquisition unit 51 acquires the boom-to-ground angle A (S11). Specifically, the ground angle acquisition unit 51 acquires the boom-to-ground angle A by subtracting the turning body inclination angle $A_2$ acquired from the inclination angle sensor 42 from the boom derricking angle $A_1$ acquired from the derricking angle sensor 41. The ground angle acquisition unit 51 notifies the identifying unit 52 and the actually suspended load calculation unit 53 of the acquired boom-to-ground angle A.

That is, as illustrated in FIG. 3, when the crawler crane 100 is disposed on an upward slope, the boom-to-ground angle A is smaller than the boom derricking angle $A_1$. On the other hand, as illustrated in FIG. 4, when the crawler crane 100 is disposed on a downward slope, the boom-to-ground angle A is larger than the boom derricking angle $A_1$.

Next, the identifying unit 52 identifies the error tension DW, the rated total load $W_C$, the non-load tension $T_0$, and the rated tension $T_2$, based on the boom derricking angle $A_1$ detected by the derricking angle sensor 41 and the boom-to-ground angle A acquired from the ground angle acquisition unit 51 (S12). That is, based on the correspondence stored in the storage unit 57, the identifying unit 52 identifies the error tension DW corresponding to the boom-to-ground angle A, the rated total load $W_C$ corresponding to the boom derricking angle $A_1$, the non-load tension $T_0$, and the rated tension $T_2$. The identifying unit 52 notifies the actually suspended load calculation unit 53 of the error tension DW, the rated total load $W_C$, the non-load tension $T_0$, and the rated tension $T_2$ which are identified.

Next, the actually suspended load calculation unit 53 acquires the actually measured tension $T_L$ from the load cell 38 (S13). The actually suspended load calculation unit 53 calculates the actually suspended load W by substituting the error tension DW acquired from the identifying unit 52, the rated total load $W_C$, the non-load tension $T_0$, the rated tension $T_2$, and the actually measured tension $T_L$ acquired from the load cell 38 for Equation (1) above (S14). The actually suspended load calculation unit 53 notifies the operation restricting unit 55 and the performance notification unit 56 of the calculated actually suspended load W.

Next, the switching unit 54 acquires the turning body inclination angle $A_2$ from the inclination angle sensor 42. Next, the switching unit 54 switches one of the plurality of rated load tables stored in the storage unit 57 to the rated load table corresponding to the acquired turning body inclination angle $A_2$ (S15). That is, the switching unit 54 reads the rated load table corresponding to the current turning body inclination angle $A_2$ from the storage unit 57, and notifies the operation restricting unit 55 and the performance notification unit 56 of the rated load table.

Figure 8:
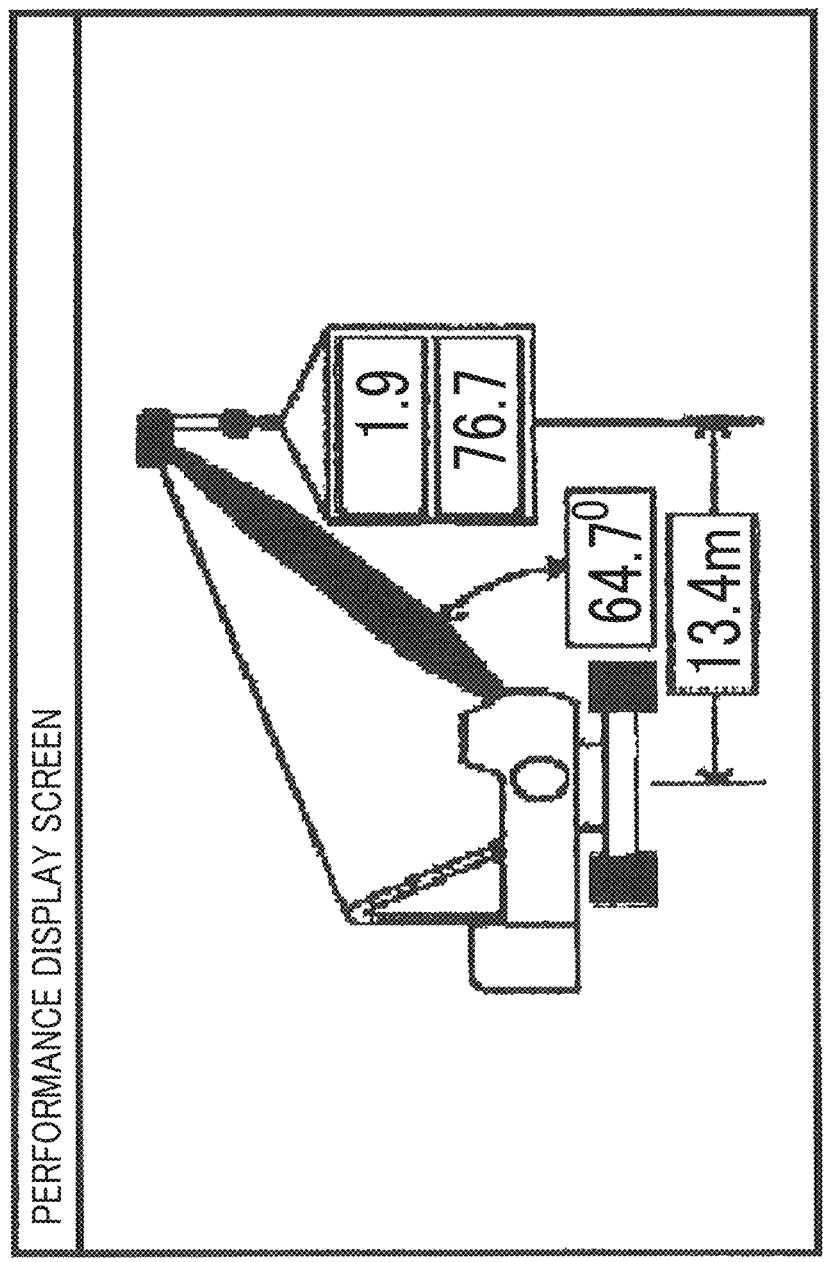
FIG. 8 illustrates a display example of a performance display screen.

Next, the performance notification unit 56 notifies the operator of the lifting performance of the crawler crane 100, based on the boom derricking angle $A_1$ acquired from the derricking angle sensor 41, the working radius R calculated from the boom derricking angle $A_1$, the actually suspended load W acquired from the actually suspended load calculation unit 53, and the rated load table acquired from the switching unit 54 (S16). Specifically, as illustrated in FIG. 8, the performance notification unit 56 displays a performance display screen on the display 58.

For example, the performance display screen includes a schematic diagram of the crawler crane 100, the current working radius R (=13.4 m) of the crawler crane 100, the boom derricking angle $A_1$ (=64.7°) acquired from the derricking angle sensor 41, the actually suspended load W (=1.9 t) acquired from the actually suspended load calculation unit 53, and the rated load (=76.7) corresponding to the current working radius R. However, the information displayed on the performance display screen is not limited to the example in FIG. 8, and may include the turning body inclination angle $A_2$ and the boom-to-ground angle A.

Next, the operation restricting unit 55 restricts the operation of the crawler crane 100 which exceeds the lifting performance, based on the actually suspended load W acquired from the actually suspended load calculation unit 53, the rated load table acquired from the switching unit 54, and the boom derricking angle $A_1$ acquired from the derricking angle sensor 41 (S17 and S18).

Specifically, the operation restricting unit 55 calculates the working radius R of the crawler crane 100, based on the current boom derricking angle $A_1$. Next, the operation restricting unit 55 identifies the rated load corresponding to the calculated working radius R, based on the rated load table acquired from the switching unit 54. Next, the operation restricting unit 55 compares the current actually suspended load W with the current rated load (S17).

In a case where the operation restricting unit 55 determines that the current actually suspended load W is equal to or greater than the current rated load (S17: Yes), the operation restricting unit 55 restricts the specific operation (S18). That is, the operation restricting unit 55 does not operate the corresponding actuator, even if the operation signal instructing the specific operation is output from the operating unit 23a. In a case where the operation signal instructing an operation different from the specific operation (for example, raising of the boom 22 or lowering of the hook 22a) is output from the operating unit 23a, the operation restricting unit 55 operates the corresponding actuator in accordance with the operation signal.

On the other hand, in a case where the operation restricting unit 55 determines that the actually suspended load W is smaller than the current rated load (S17: No), the operation restricting unit 55 proceeds to processes subsequent to Step S19 without performing the process in Step S18. That is, the operation restricting unit 55 operates the corresponding actuator in accordance with the operation signal output from the operating unit 23a regardless of whether or not the specific operation is instructed.

While the operation signal instructing the specific operation is continuously output (S19: No), the controller 50 repeatedly performs the processes in Steps S11 to S18. On the other hand, in a case where the output of the operation signal instructing the specific operation is stopped (S19: Yes), the controller 50 completes the operation control process.

According to the embodiment, the following operation effects are achieved, for example.

According to the embodiment, instead of the boom derricking angle $A_1$, the actually suspended load W (more specifically, the error tension DW) is calculated based on the boom-to-ground angle A. Therefore, even in a case where the crawler crane 100 is disposed on an inclined surface, the actually suspended load W can be very accurately calculated.

According to the embodiment, the lifting performance (that is, the rated load table) is switched based on the turning body inclination angle $A_2$. Therefore, even in a case where the crawler crane 100 is used on the inclined surface, the crawler crane 100 can be effectively prevented from being fallen down.

Furthermore, according to the embodiment, the actually suspended load W or the lifting performance is notified through the performance display screen illustrated in FIG. 8. Therefore, the operator who uses the crawler crane 100 on the inclined surface can pay attention to the actually suspended load W or the lifting performance.

In the embodiment, an example has been described in which the actually measured tension $T_L$ applied to the derricking rope 24a is set as the derricking force. However, the derricking force measurement unit may measure other physical quantities that vary corresponding to the derricking force. As another example, the derricking force measurement unit may measure the tension applied to the pendant rope 37 as the derricking force. As another example, a load applied to a drum of the derricking winch 24 can be estimated based on motor capacity or motor pressure of a hydraulic motor that rotates the derricking winch 24. Therefore, the derricking force measurement unit may measure the motor capacity or the motor pressure of the hydraulic motor as the derricking force. As still another example, in a case where the boom 22 performs the derricking operation by using the hydraulic cylinder that expands and contracts by receiving the hydraulic oil supplied from the hydraulic pump, the derricking force measurement unit may measure the hydraulic pressure of the hydraulic oil supplied to the hydraulic cylinder, as the derricking force.

In the embodiment, the ground angle acquisition unit 51 calculates the boom-to-ground angle A, based on the boom derricking angle $A_1$ acquired from the derricking angle sensor 41 and the turning body inclination angle $A_2$ acquired from the inclination angle sensor 42. However, a method of acquiring the boom-to-ground angle A is not limited to the above-described example.

As another example, instead of the inclination angle sensor 42, the crawler crane 100 may include map data stored in the storage unit 57 and a GPS antenna that acquires position information of the crawler crane 100. The map data includes gradient information indicating a gradient of each point. The ground angle acquisition unit 51 may read the gradient of a current position of the crawler crane 100 which is acquired through the GPS antenna, from map data, and may use the gradient as the turning body inclination angle $A_2$.

The map data may not be stored in the storage unit 57, and may be stored in a server accessible via a communication network. The ground angle acquisition unit 51 may transmit the position information acquired from the GPS antenna to the server through a communication interface, and may receive a response of gradient information on a current location from the server through the communication interface.

Furthermore, the ground angle acquisition unit 51 may cause an external device to measure the boom-to-ground angle A, and may acquire the measured boom-to-ground angle A from the external device. For example, a specific example of the external device includes a plurality of fixed-point cameras disposed around the crawler crane 100 or an unmanned aerial vehicle (UAV) flying around the crawler crane 100.

Furthermore, without being limited to the crawler crane 100, a specific example of the mobile crane maybe a wheel crane, a rough terrain crane, or an all-terrain crane.

Another Embodiment

Figure 9:
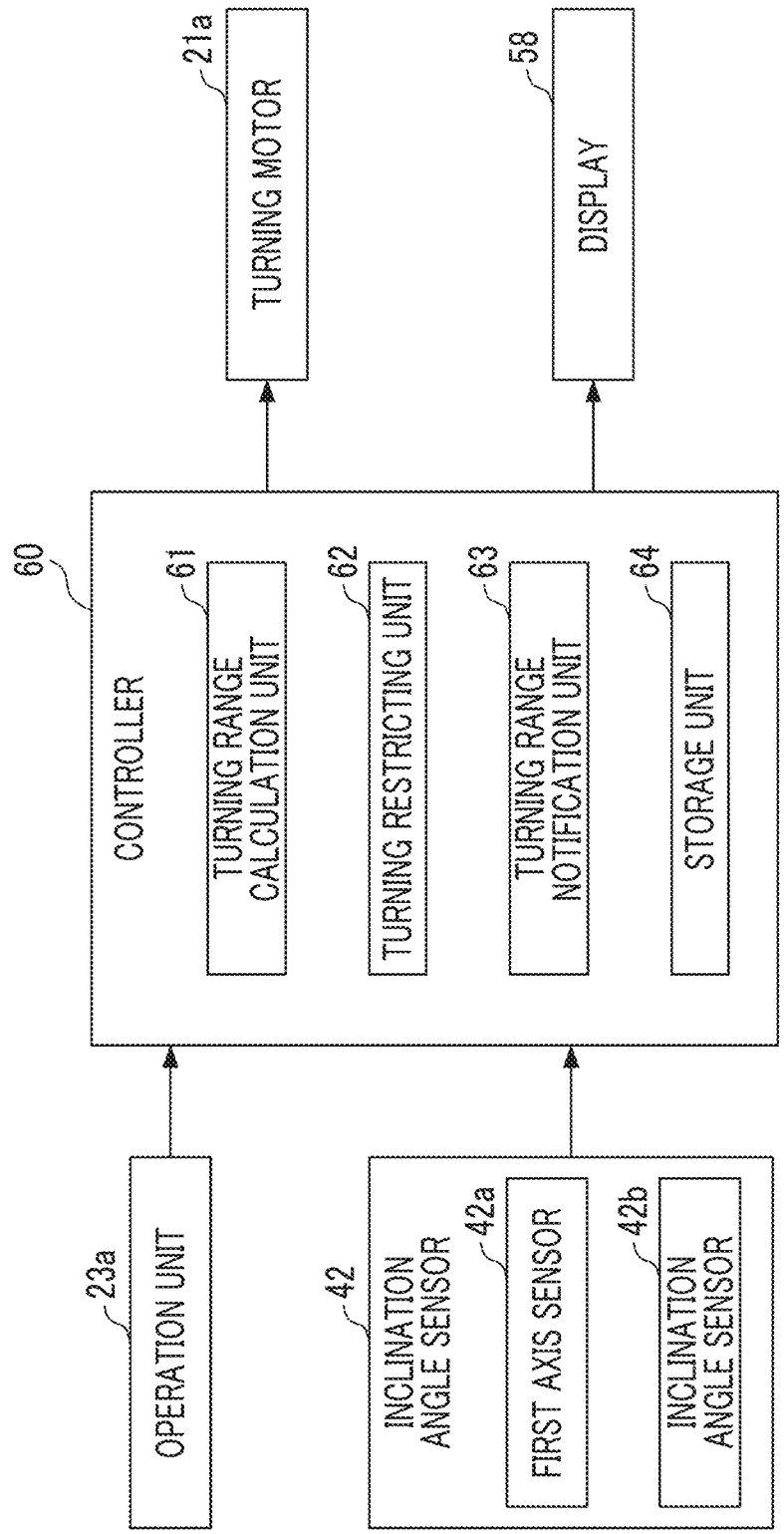
FIG. 9 is a functional block diagram of a controller according to another embodiment.
Figure 10:
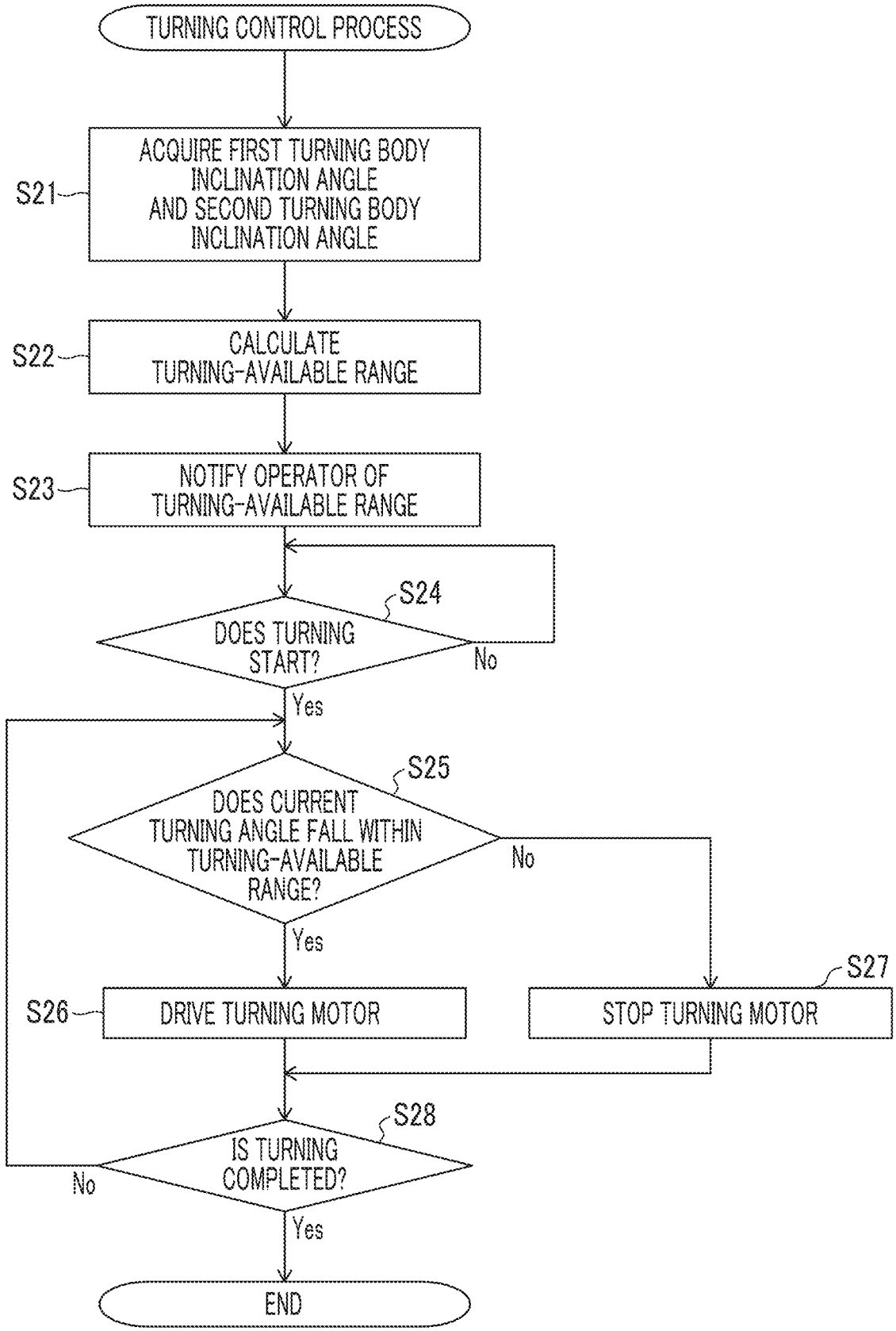
FIG. 10 is a flowchart of a turning control process.

Next, the crawler crane 100 according to another embodiment will be described with reference to FIGS. 9 to 11. FIG. 9 is a functional block diagram of a controller 60. FIG. 10 is a flowchart of a turning control process performed by the controller 60. FIG. 11 is a display example of a turning-available range display screen displayed on the display 58.

Detailed description on points common to those according to the above-described embodiment will be omitted, and different points will mainly be described. The above-described embodiment and another embodiment can be combined with each other within the scope not departing from the concept of the present invention.

The inclination angle sensor 42 according to another embodiment is a two-axis sensor including a first axis sensor 42a and a second axis sensor 42b. The first axis sensor 42a detects a first turning body inclination angle which is an angle of the rotating platform 20 relative to a first horizontal line extending in the forward-rearward direction of the rotating platform 20, and outputs the first turning body inclination angle to the controller 60. The second axis sensor 42b detects a second turning body inclination angle which is an angle of the rotating platform 20 relative to a second horizontal line extending in the rightward-leftward direction of the rotating platform 20, and outputs the second turning body inclination angle to the controller 60.

That is, the first axis sensor 42a and the second axis sensor 42b detect the inclination angle of the rotating platform 20, based on the horizontal lines perpendicular to each other. However, the extending directions of the first horizontal line and the second horizontal line are not limited to the above-described example, and may be any desired directions perpendicular to each other.

The controller 60 according to another embodiment includes a turning range calculation unit 61, a turning restricting unit 62, a turning range notification unit 63, and a storage unit 64. The controller 60 according to another embodiment may be realized by the CPU, the ROM, the RAM, and the HDD as in the controller 50 according to the above-described embodiment, and may be realized by hardware such as the ASIC and the FPGA.

The turning range calculation unit 61 acquires the first turning body inclination angle and the second turning body inclination angle from the inclination angle sensor 42, and calculates the inclination angle of the rotating platform 20 in all directions (360°). That is, the turning range calculation unit 61 can calculate the inclination angle of the rotating platform 20 for each turning angle by substituting two turning body inclination angles perpendicular to each other and respective turning angles (0°, 1°, 2°, 3°, . . . , 359°) for a known trigonometric function.

Next, the turning range calculation unit 61 calculates the turning-available range of the rotating platform 20, based on the inclination angle of the rotating platform 20 for each turning angle, and notifies the turning restricting unit 62 and the turning range notification unit 63 of the calculated turning-available range. The turning-available range indicates a range where the inclination angle of the rotating platform 20 is smaller than a threshold angle. As the threshold angle, a predetermined value may be stored in the storage unit 57, or the threshold angle may be set by an operator through a turning-available range display screen (to be described later).

The turning restricting unit 62 restricts turning of the rotating platform 20 which exceeds the turning-available range acquired from the turning range calculation unit 61. That is, while the rotating platform 20 is disposed in the turning-available range, the turning restricting unit 62 drives the turning motor 21a in accordance with the operation signal output from the operating unit 23a. On the other hand, if the rotating platform 20 reaches an end portion of the turning-available range, the turning restricting unit 62 stops driving the turning motor 21a in a direction where the rotating platform 20 exceeds the turning-available range.

The turning range notification unit 63 notifies the operator of the turning-available range acquired from the turning range calculation unit 61 through the display 58. For example, the turning range notification unit 63 causes the display 58 to display the turning-available range display screen illustrated in FIG. 11.

Next, the turning control process will be described with reference to FIG. 10. For example, the controller 60 may start the turning control process in accordance with extension of an outrigger (not illustrated) included in the crawler crane 100. It is assumed that the turning angle of the rotating platform 20 is set to 0° and the threshold angle is set to 2° when the turning control process starts.

First, the turning range calculation unit 61 acquires the first turning body inclination angle from the first axis sensor 42a, and acquires the second turning body inclination angle from the second axis sensor 42b (S21). Next, the turning range calculation unit 61 calculates the inclination angle of the rotating platform 20 corresponding to the respective turning angles (0°, 1°, 2°, 3°, . . . , 359°), based on the acquired first turning body inclination angle and second turning body inclination angle. Next, the turning range calculation unit 61 calculates a range where the calculated inclination angle is smaller than the threshold angle (2°), as the turning-available range (S22). The turning range calculation unit 61 notifies the turning restricting unit 62 and the turning range notification unit 63 of the calculated turning-available range.

Next, the turning range notification unit 63 causes the display 58 to display the turning-available range display screen illustrated in FIG. 11, based on the turning-available range acquired from the turning range calculation unit 61 (S23).

For example, the turning-available range display screen includes a change button for changing the current turning angle) (=30°) of the rotating platform 20 based on a front surface of the lower traveling body 10, the turning-available ranges (0° to 135° and 225° to 360°), the turning restricting range indicated by hatching (135° to 225°), the current threshold angle (=2°), and the threshold angle. However, information to be displayed on the turning-available range display screen is not limited to the example in FIG. 11, and may include the inclination angle of the rotating platform 20 for each turning angle.

Next, the turning restricting unit 62 waits for the processes subsequent to Step S25 until the operation signal instructing the turning of the rotating platform 20 is output from the operating unit 23a (S24: No). Next, in accordance with a notification that the operation signal instructing the turning of the rotating platform 20 is output from the operating unit 23a (S24: Yes), the turning restricting unit 62 determines whether or not the current turning angle of rotating platform 20 falls within the turning-available range (S25).

In accordance with a notification that the current turning angle of the rotating platform 20 falls within the turning-available range (S25: Yes), the turning restricting unit 62 drives the turning motor 21a in response to the operation signal output from the operating unit 23a (S26). On the other hand, in accordance with a notification that the current turning angle of the rotating platform 20 reaches an end of the turning-available range (S25: No), the turning restricting unit 62 stops the turning motor 21a, even if the operation signal is output from the operating unit 23a (S27). The controller 60 repeatedly performs the processes from Steps S25 to S27 until the output of the operation signal is stopped from the operating unit 23a (S28: No).

According to another embodiment, the following operation effects are achieved, for example.

First, according to another embodiment, the first axis sensor 42a and the second axis sensor 42b are provided. Therefore, the turning-available range of the rotating platform 20 can be calculated before the rotating platform 20 is turned.

According to another embodiment, the operator can recognize the turning-available range calculated in advance through the turning-available range display screen. Therefore, the operator can carry out work within a range where the operator has a low risk to falling accidents. In accordance with the notification that the turning angle of the rotating platform 20 reaches the end of the turning-available range, the crawler crane 100 is stopped not to turn anymore. Therefore, the crawler crane 100 can be effectively prevented from being fallen down.

The present invention is not limited to the above-described embodiments, and various modifications can be made within the scope not departing from the concept of the present invention. All technical matters included in the technical idea disclosed in the appended claims are provided for the present invention. The above-described embodiments show preferred examples. However, those skilled in the art can realize various alternative examples, correction examples, modification examples, or improvement examples from the contents disclosed herein. These examples are included in the technical scope disclosed in the appended claims.

It should be understood that the invention is not limited to the above-described embodiment, but may be modified into various forms on the basis of the spirit of the invention. Additionally, the modifications are included in the scope of the invention.

What is claimed is:

1. A mobile crane comprising:
   an undercarriage;
   a turning body turnably supported by the undercarriage;
   a boom derrickably supported by the turning body;
   a derrick that causes the boom to perform a derricking operation;
   a derricking force gauge that measures a derricking force by which the derrick causes the boom to perform the derricking operation;
   a derricking angle sensor configured to detect a boom derricking angle $A_1$ which is an angle formed by the boom relative to a first horizontal line perpendicular to gravity direction and extending a forward-rearward direction of the mobile crane;
   an inclination angle sensor configured to detect a turning body inclination angle $A_2$ which is an angle of the turning body relative to the first horizontal line; and
   a controller,
   wherein the controller is configured to
      acquire a boom-to-ground angle A which is an angle around an axis about which the boom rotates due to the derricking operation relative to a ground where the undercarriage is disposed and which has a value changing according to an inclination of the ground, based on the boom derricking angle $A_1$ and the turning body inclination angle $A_2$,
      calculate an actually suspended load W, based on the derricking force and the boom-to-ground angle A, and
      restrict an operation of the mobile crane which exceeds a lifting performance, at least based on the calculated actually suspended load W.

2. The mobile crane according to claim 1,
   wherein the derrick is a derricking winch that causes the boom to perform the derricking operation by winding or unwinding a derricking rope,
   wherein the derricking force gauge is a tension sensor that detects an actually measured tension $T_L$ applied to the derricking rope as the derricking force,
   wherein the mobile crane further comprises a backstop that presses the boom in a downward falling direction when the boom-to-ground angle A reaches a threshold angle, and
   wherein the controller is configured to
      identify an error tension DW applied to the derricking rope by a pressing force of the backstop, based on the boom-to-ground angle A, and
      calculate the actually suspended load W, based on the actually measured tension $T_L$, the error tension DW identified based on the boom-to-ground angle A, and the boom derricking angle $A_1$.

3. The mobile crane according to claim 2,
   wherein the controller is configured to
      identify a rated total load $W_C$, a non-load tension $T_0$ applied to the derricking rope when there is no suspended load, and a rated tension $T_2$ applied to the derricking rope when the rated total load $W_C$ is suspended, based on the boom derricking angle $A_1$, and
      calculate the actually suspended load W by substituting the rated total load $W_C$, the non-load tension $T_0$, the rated tension $T_2$, and the error tension DW which are identified by the controller, and the actually measured tension $T_L$ for $W=\{(T_L-T_0-DW)/(T_2-T_0)\}\times W_C$.

4. The mobile crane according to claim 1, further comprising:
   a storage that stores a plurality of rated loads indicating the lifting performance for a load suspended by the boom in association with the turning body inclination angle $A_2$,
   wherein the controller is configured to perform switching to the rated load corresponding to the current turning body inclination angle $A_2$ out of the plurality of rated loads stored in the storage.

5. The mobile crane according to claim 4,
   wherein the controller is configured to restrict an operation of the mobile crane which exceeds the lifting performance, based on the calculated actually suspended load W and the switched rated load.

6. The mobile crane according to claim 4,
   wherein the controller is configured to notify an operator of the lifting performance indicated by the switched rated load.

7. The mobile crane according to claim 1, further comprising:
   the inclination angle sensor includes a first angle sensor that detects a first turning body inclination angle which is an angle of the turning body relative to a second horizontal line perpendicular to gravity direction, and a second angle sensor that detects a second turning body inclination angle which is an angle of the turning body relative to a third horizontal line perpendicular to gravity direction and intersecting the second horizontal line,
   wherein the controller is configured to calculate a turning-available range of the turning body, based on the first turning body inclination angle and the second turning body inclination angle.

8. The mobile crane according to claim 7,
wherein the controller is configured to restrict turning of the turning body which exceeds the calculated turning-available range.

9. The mobile crane according to claim 7,
wherein the controller is configured to notify an operator of the calculated turning-available range.

10. The mobile crane according to claim 1, further comprising:
a counterweight mounted on the turning body on a side opposite to the boom across a turning center of the turning body,
wherein the inclination angle sensor is disposed in front of the counterweight in a forward-rearward direction of the turning body.

11. The mobile crane according to claim 10, further comprising:
a turning wheel that turnably supports the turning body relative to the undercarriage,
wherein the inclination angle sensor is disposed between a front end and a rear end of the turning wheel in the forward-rearward direction of the turning body.

12. The mobile crane according to claim 1,
wherein the controller is further configured to:
calculate a turning-available range of the turning body, and
cause a display to display the turning-available range.

13. The mobile crane according to claim 12,
wherein the controller is further configured to cause the display to display a current turning angle of the turning body.

14. The mobile crane according to claim 12,
wherein the controller is further configured to cause the display to display a turning restricting range.

* * * * *